United States Patent
Sun

(10) Patent No.: US 10,509,961 B2
(45) Date of Patent: Dec. 17, 2019

(54) BLINDMAN NAVIGATION METHOD AND BLINDMAN NAVIGATION APPARATUS

(71) Applicant: BOE TECHNOLOGY GROUP CO., LTD., Beijing (CN)

(72) Inventor: Mengmeng Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 158 days.

(21) Appl. No.: 15/533,328

(22) PCT Filed: May 23, 2016

(86) PCT No.: PCT/CN2016/082982
§ 371 (c)(1),
(2) Date: Jun. 5, 2017

(87) PCT Pub. No.: WO2017/161666
PCT Pub. Date: Sep. 28, 2017

(65) Prior Publication Data
US 2018/0060660 A1    Mar. 1, 2018

(30) Foreign Application Priority Data

Mar. 23, 2016 (CN) .......................... 2016 1 0170391

(51) Int. Cl.
*G06K 9/00* (2006.01)
*G01C 3/06* (2006.01)
*G01J 3/46* (2006.01)

(52) U.S. Cl.
CPC ........... *G06K 9/00671* (2013.01); *G01C 3/06* (2013.01); *G01J 3/46* (2013.01); *G06K 9/00697* (2013.01)

(58) Field of Classification Search
CPC ........... G06K 9/00671; G06K 9/00825; G06K 9/00697; G01C 3/06; G01C 21/20;
(Continued)

(56) References Cited

U.S. PATENT DOCUMENTS 6,774,788 B1 * 8/2004 Balfe ..................... A61H 3/061
340/4.12
7,230,538 B2 * 6/2007 Lai ......................... A61H 3/061
340/4.12
(Continued)

FOREIGN PATENT DOCUMENTS

| CN | 1044806 A | 3/2003 |
|---|---|---|
| CN | 200511977 A | 4/2005 |

(Continued)

OTHER PUBLICATIONS

First Chinese Office Action, for Chinese Patent Application No. 201610170391.0, dated Aug. 25, 2017, 20 pages.
(Continued)

*Primary Examiner* — Jonathan S Lee
(74) *Attorney, Agent, or Firm* — Kinney & Lange, P.A.

(57) ABSTRACT

The present disclosure relates to navigation field and discloses a blindman navigation method and a blindman navigation apparatus. The blindman navigation method includes: obtaining image information of surroundings where a user is located; determining a distance between the user and a traffic signal light according to the image information; judging a distance between the user and a crossing according to the distance between the user and the traffic signal light, and determining the user is in a state where he/she has arrived at the crossing when the distance between the user and the crossing is less than a distance threshold that is preset.

10 Claims, 6 Drawing Sheets

(58) Field of Classification Search
CPC ... G01C 21/3407; G01C 21/3602; G01J 3/46; G06T 7/00
USPC .......................................................... 382/190
See application file for complete search history.

(56) References Cited

U.S. PATENT DOCUMENTS

| | | | | |
|---|---|---|---|---|
| 9,189,973 | B2* | 11/2015 | Wexler | G09B 21/006 |
| 9,305,224 | B1* | 4/2016 | Chen | G06K 9/00825 |
| 9,460,635 | B2* | 10/2016 | Yu | G09B 21/003 |
| 2012/0212593 | A1* | 8/2012 | Na'aman | G06K 9/00671 |
| | | | | 348/62 |
| 2016/0151231 | A1* | 6/2016 | Villar Cloquell | G09B 21/001 |
| | | | | 340/944 |
| 2017/0206427 | A1* | 7/2017 | Ginsberg | G06K 9/00724 |
| 2018/0308352 | A1* | 10/2018 | Li | G08G 1/07 |

FOREIGN PATENT DOCUMENTS

| | | |
|---|---|---|
| CN | 101950478 A | 1/2011 |
| CN | 102785645 A | 11/2012 |
| CN | 104183149 A | 12/2014 |
| CN | 104700613 A | 6/2015 |
| CN | 104730734 A | 6/2015 |
| CN | 105185140 A | 12/2015 |
| CN | 204814723 U | 12/2015 |
| JP | 2000180159 A | 6/2000 |
| WO | 2015007929 A1 | 1/2015 |
| WO | 2016037195 A1 | 3/2016 |

OTHER PUBLICATIONS

International Search Report and Written Opinion dated Dec. 30, 2017 for corresponding PCT Application No. PCT/CN2016/082982.

* cited by examiner

BLINDMAN NAVIGATION METHOD AND BLINDMAN NAVIGATION APPARATUS

CROSS-REFERENCE TO RELATED APPLICATIONS

The present application claims priority to Chinese Patent Application No. 201610170391.0, filed on Mar. 23, 2016, entitled "BLINDMAN NAVIGATION METHOD AND BLINDMAN NAVIGATION APPARATUS", which is incorporated herein by reference in its entirety.

BACKGROUND

1. Technical Field

The present disclosure relates to navigation technical field, and particularly to a blindman navigation method and a blindman navigation apparatus.

2. Description of the Related Art

It is estimated by world health organization that there are 40~45 million blindmans in the world, in which 6~7 million blindmans are Chinese, occupying 18% of all of the blindmans in the world. Blindman is confronted with lots of inconvenience in daily lift, particularly in outside activity. Complex traffic surroundings bring great hidden trouble to blindman's travel. It is a problem to be solved for the whole world to ensure a safety outside travel of blindman.

There are existing a plurality of navigation apparatuses for the blind, such as a smart walking stick having piloting navigation function, which may acquire information on surroundings where a user is located and output the information by voice so as to provide navigation of walking way. However, the existing navigation apparatuses do not have function of identifying whether the user arrives at a crossing, and thus cannot provide in time navigation information for passing across the crossing when it is used by a blindman and the blindman needs to pass the crossing, thereby the blindman's outside travel still existing rather great hidden trouble.

SUMMARY

The present disclosure provides a blindman navigation method and a blindman navigation apparatus, which may function to determine whether a user arrives at a crossing or not and thus may enhance safety for the user in outside travel.

In order to achieve the above object, the present disclosure provides the following technical schemes:

a blindman navigation method includes:

obtaining image information of surroundings where a user is located;

determining a distance between the user and a traffic signal light according to the image information; and judging a distance between the user and a crossing according to the distance between the user and the traffic signal light, and determining the user is in a state where he/she has arrived at the crossing when the distance between the user and the crossing is less than a distance threshold that is preset.

As an aspect, the determining a distance between the user and a traffic signal light according to the image information comprises:

generating traffic signal light shape information according to the image information; and determining the distance between the user and the traffic signal light according to a corresponding variation relationship between a size of the traffic signal light in the generated traffic signal light shape information and a distance between the user and the traffic signal light.

As an aspect, the generating the traffic signal light shape information according to the image information comprises:

performing an enhancement treatment on the image information obtained;

converting the image information after the enhancement treatment from a RGB color space to an HSV color space; and extracting an edge feature of a region with a specific brightness according to a brightness component in the image information, and comparing the extracted edge feature of the region with the specific brightness with an edge feature of the traffic signal light that is preset so as to extract an image of the traffic signal light in the region with the specific brightness to generate traffic signal light shape information.

As an aspect, the judging the distance between the user and the crossing according to the distance between the user and a traffic signal light comprises:

comparing the distance between the user and the traffic signal light with a first distance threshold that is preset; and determining the user is in a state where he/she has arrived at the crossing when the distance between the user and the traffic signal light is less than or equal to the first distance threshold.

As an aspect, the judging the distance between the user and the crossing according to the distance between the user and a traffic signal light comprises:

acquiring a width of a road;

calculating a difference value between the distance between the user and the traffic signal light and the width of the road; and determining the user is in a state where he/she has arrived at the crossing if the difference value is less than or equal to a second distance threshold.

As an aspect, the blindman navigation method further includes:

determining traffic signal light color information and traffic signal light duration information according the image information when determining the user is in a state where he/she has arrived at the crossing, and obtaining acceleration information of the user;

generating navigation information according to the traffic signal light color information, the traffic signal light duration information and the acceleration information, the navigation information including stop information and advance information.

As an aspect, the determining the traffic signal light color information and the traffic signal light duration information according the image information comprises:

determining a color of the traffic signal light according to a hue component of the traffic signal light image extracted, and generating the traffic signal light color information; and identifying a digital image of a specific traffic signal light color information to determine a rest duration of the traffic signal light and generate the traffic signal light duration information.

As an aspect, the generating navigation information according to the traffic signal light color information, the traffic signal light duration information and the acceleration information comprises:

judging whether a color of the current traffic signal light is green or not according to the traffic signal light color information, and generating the stop information when the color of the traffic signal light is not green;

generating the traffic signal light duration information when the color of the current traffic signal light is green, and obtaining the acceleration information of the user, to determine an average advance velocity of the user according to the acceleration information obtained;

generating a theoretical traveling distance according to a product of the average advance velocity and the traffic signal light duration and comparing the theoretical traveling distance with the distance information; and generating the advance information when the theoretical traveling distance is greater than the distance information;

generating the stop information when the theoretical traveling distance is less than the distance information.

As an aspect, the blindman navigation method further includes: converting the navigation information into an audio signal to transmit it to a voice device, and controlling the voice device to convert the audio signal into voice and play it.

As an aspect, the blindman navigation method further includes: judging whether the user tumbles or not according to the acceleration information obtained, and judging the user has tumbled when a value of the acceleration information in a vertical direction is greater than a preset value and generating an alarm signal when judging the user has tumbled;

controlling the alarm device to make an alarm according to the alarm signal.

As an aspect, the controlling the alarm device to make an alarm according to the alarm signal comprises:

controlling the alarm device to send out an acousto-optic alarm.

As an aspect, the blindman navigation method further includes: further controlling a communication device to make a call to an associated mobile terminal and transmitting tumble alarm information including preset content, when generating the alarm signal.

As an aspect, the tumble alarm information including preset content comprises tumble prompt information and user's position information.

The present disclosure further provides a blindman navigation apparatus comprising: an image acquisition device and a navigation device which are allowed to be put on a user's head, an output terminal of the image acquisition device being in connection with an input terminal of the navigation device, wherein:

the image acquisition device is configured to acquire image information of surroundings where the user is located and transmit the image information to the navigation device; and the navigation device is configured to determine a distance between the user and a traffic signal light according to the image information, and judge a distance between the user and a crossing according to the distance between the user and the traffic signal light and determine the user is in a state where he/she has arrived at the crossing when the distance between the user and the crossing is less than a distance threshold that is preset.

As an aspect, the navigation device includes a traffic signal light shape information module and a distance determination module, an input terminal of the traffic signal light shape information module is in connection with an output terminal of the image acquisition module, and an input terminal of the distance determination module is in connection with an output terminal of the traffic signal light shape information module;

the traffic signal light shape information module is configured to perform an enhancement treatment on the obtained image information and convert the image information after the enhancement treatment from a RGB color space to an HSV color space, and extract an edge feature of a region with a specific brightness according to a brightness component in the image information, and compare the extracted edge feature of a region with the specific brightness with an edge feature of the traffic signal light that is preset so as to extract an image of the traffic signal light in the region with the specific brightness to generate the traffic signal light shape information; and the distance determination module is configured to determine a distance between the user and the traffic signal light according to a corresponding variation relationship between a size of the traffic signal light in the generated traffic signal light shape information and a distance between the user and the traffic signal light, and generate traffic signal light distance information.

As an aspect, the navigation device further includes a state determination module, an input terminal of the state determination module being in connection with an output terminal of the distance determination module;

the state determination module is configured to receive the traffic signal light distance information from the distance determination module to compare the distance between the user and the traffic signal light with a first distance threshold that is preset; and to determine the user is in a state where he/she has arrived at the crossing when the distance between the user and the traffic signal light is less than or equal to the first distance threshold, and generate navigation instruction information.

As an aspect, the blindman navigation apparatus further includes an auxiliary navigation device configurable on the traffic signal light;

the navigation device further comprises a state determination module, an input terminal of the state determination module being in connection with an output terminal of the distance determination module, the auxiliary navigation device being in wirelessly connection with the state determination module that is located in an effective transmission distance therefrom;

the auxiliary navigation device is configured to store width information of the road where the traffic signal light is located and transmit the width information of the road to the navigation device which is wirelessly connected thereto;

the state determination module is configured to receive the width information of the road from the auxiliary navigation device and calculate a difference value between the distance between the user and the traffic signal light and the width of the road, and determine the user is in a state where he/she has arrived at the crossing when the difference value is less than or equal to the second distance threshold, and generate navigation instruction information.

As an aspect, the navigation device further comprises an acceleration detection device that is allowed to be put on the user's head, an output terminal of the acceleration detection device being in connection with an input terminal of the navigation device;

the navigation device further comprises a traffic signal light color information module and a traffic signal light duration information module, an input terminal of the traffic signal light color information module being in connection with an output terminal of the traffic signal light shape information module, an input terminal of the traffic signal light duration information module being in connection with an output terminal of the traffic signal light color information module;

the navigation device further comprises a navigation information module, an input terminal of the navigation information module is respectively in connection with output terminals of the state determination module, the traffic signal light color information module, the traffic signal light duration information module, the acceleration detection device and the auxiliary navigation device; wherein:

the acceleration detection device is configured to acquire acceleration information of the user and transmit the acceleration information to the navigation information module;

the traffic signal light color information module is configured to determine a color of the traffic signal light according to a hue component in the extracted traffic signal light image and generate the traffic signal light color information and transmit it to the navigation information module;

the traffic signal light duration information module is configured to identify a digital image in the extracted traffic signal light image to determine a rest duration of the traffic signal light and generate the traffic signal light duration information and transmit it to the navigation information module;

the navigation information module is configured to, after receiving the navigation instruction information from the state determination module, judge whether the color of the traffic signal light is green according to the traffic signal light color information, and generate the stop information when the color of the traffic signal light color is not green;

the navigation information module is further configured to calculate an average advance velocity of the user according to the acceleration information when the color of the traffic signal light is green, and generate a theoretical traveling distance according to a product of the average advance velocity and the traffic signal light duration, and compare the theoretical traveling distance with the distance information; and the navigation information module is further configured to generate the advance information when the theoretical traveling distance is greater than the distance information, and to generate the stop information when the theoretical traveling distance is less than the distance information.

As an aspect, the blindman navigation apparatus further includes a voice device that is allowed to be put on the user's head, an input terminal of the voice device being in connection with an output terminal of the navigation information module;

the navigation information module is further configured to convert the navigation information into an audio signal and transmit it to the voice device; and the voice device is configured to convert the audio signal into voice and play it.

As an aspect, the voice device includes at least an earphone, an input terminal of which is in connection with an output terminal of the navigation device and which is configured to convert the audio signal into voice and play it.

As an aspect, the blindman navigation apparatus further includes a tumble alarm device, which comprises a tumble detection module and an alarm module, an input terminal of the tumble detection module being in connection with an output of the acceleration detection device and an input terminal of the alarm module being in connection with an output terminal of the tumble detection module;

the tumble detection module is configured to judge whether the user tumbles or not according to the acceleration information obtained, and judge the user tumbles when a value of the acceleration information in the vertical direction is greater than the preset value and generate an alarm signal when judging the user has tumbled and make the alarm information to the alarm module;

the alarm module is configured to transmit an alarm according to the alarm information.

As an aspect, the alarm module includes a voice alarm module and a light alarm module, input terminals of the voice alarm module and the light alarm module being in connection with an output terminal of the tumble detection module respectively, and the voice alarm module is configured to send out an alarm voice according to the alarm signal and the light alarm module is configured to send out alarm light according to the alarm signal.

As an aspect, the blindman navigation apparatus further includes a communication device, an input terminal of which is in connection with an output terminal of the tumble detection module and which is configured to make a call to an associated mobile terminal when receiving the alarm signal and transmits the tumble alarm information including preset content.

As an aspect, the blindman navigation apparatus further includes a communication device, an input terminal of which is in connection with an output terminal of the tumble detection module and which is configured to make a call to the associated mobile terminal when receiving the alarm signal and transmits the tumble alarm information including preset content.

As an aspect, the communication device includes a tumble prompt module and a position module, input terminals of the tumble prompt module and the position module being in connection with an output terminal of the acceleration processing device, and the tumble prompt module is configured make a call to the associated mobile terminal when receiving the alarm signal and transmit the tumble prompt information and the position module is configured to make a call to the associated mobile terminal when receiving the alarm signal and transmit position information of the user.

As an aspect, the image acquisition device comprises at least a camera, an output terminal of which is in connection with an input terminal of the navigation device and which is configured to shoot the image of the surroundings where the user is located and generates the image information and transmit the image information to the navigation device.

DETAILED DESCRIPTION OF THE EMBODIMENTS

Technical schemes of embodiments of the present disclosure will be clearly and completely described by conjunction with the drawings of the embodiments. Obviously, the illustrated embodiments only are parts, instead of all, of the embodiments of the invention. Based on the embodiments in the present disclosure, all other embodiments that may be obtained by those skilled in the art without inventive labor fall within scopes of the present invention.

An Embodiment of the present disclosure provides a blindman navigation method, comprising: obtaining image information of surroundings where a user is located; determining a distance between the user and a traffic signal light according to the image information; judging a distance between the user and a crossing according to the distance between the user and the traffic signal light, and determining the user is in a state where he/she has arrived at the crossing when the distance between the user and the crossing is less than a distance threshold that is preset.

Figure 1:
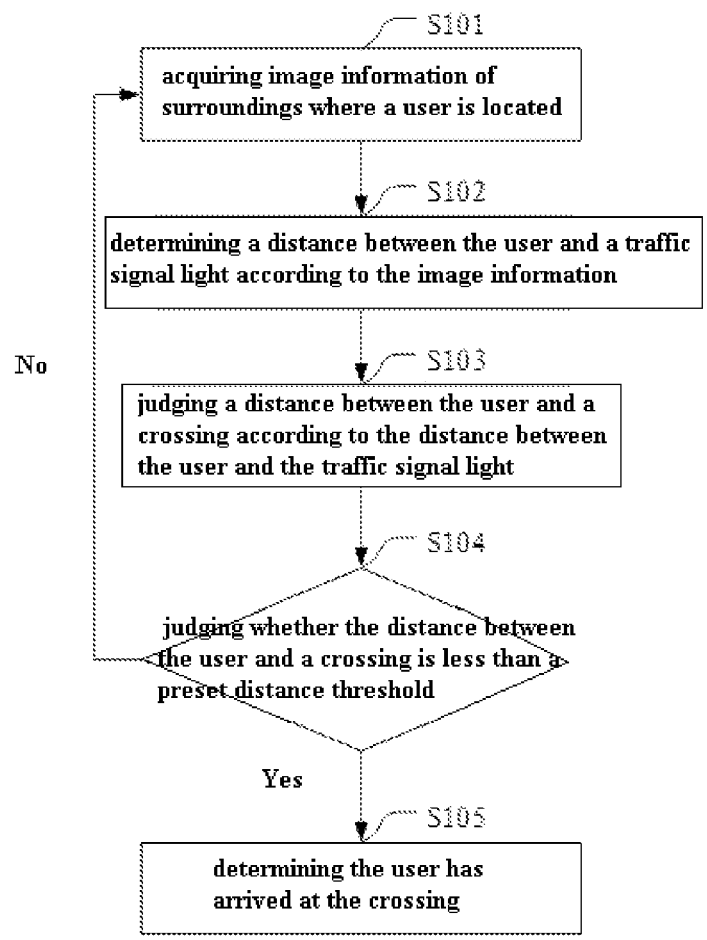
FIG. 1 is a flow chart of a process of judging whether a user is in a state where he has arrived a crossing according to a blinding navigation method provided by embodiment 1 of the present disclosure.

FIG. 1 illustrates an embodiment of the present disclosure. A blindman navigation method includes:

Step S101: acquiring image information of surroundings where a user is located;

Step S102: determining a distance between the user and a traffic signal light according to the image information;

Step S103: judging a distance between the user and a crossing according to the distance between the user and the traffic signal light;

Step S104: judging whether the distance between the user and a crossing is less than a distance threshold that is preset or not, and performing step S105 when the distance between the user and a crossing is less than the preset distance threshold; and performing step S101 when the distance between the user and a crossing is greater than or equal to the preset distance threshold;

Step S105: determining the user is in a state where he/she has arrived at the crossing.

In the blindman navigation method, the image information of the surroundings where the user is located is obtained by step S101, the distance between the user and the traffic signal light is determined by step S102, the distance between the user and a crossing is determined by step S103, whether the distance between the user and a crossing is less than the preset distance threshold is judged by step S104 and it is determined that the user is in a state where he/she has arrived at the crossing when the distance between the user and a crossing is less than the preset distance threshold. When a user is of outside activity and passes through a crossing where a traffic signal light is provided, the navigation method may be used to identify whether the user arrivals at the crossing and provide follow-up navigation action according to indication of the traffic signal light at the crossing, increasing safety for the user in situation where he arrivals at the crossing.

Figure 2:
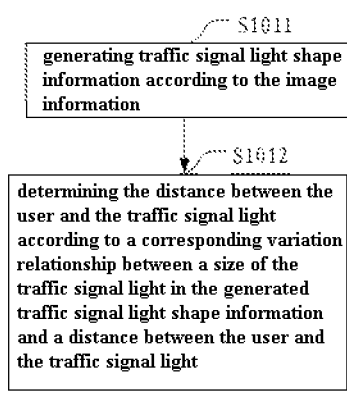
FIG. 2 is a flow chart of specific step S101 in FIG. 1.

In an embodiment of the present disclosure as shown in FIG. 2, the step S102 of determining a distance between the user and a traffic signal light according to the image information comprises:

Step S1021: generating traffic signal light shape information according to the image information; and Step S1022: determining the distance between the user and the traffic signal light according to a corresponding variation relationship between a size of the traffic signal light in the generated traffic signal light shape information and a distance between the user and the traffic signal light.

In an embodiment, the traffic signal light shape information in step S1022 includes shape and size of the traffic signal light; as the user advances toward the traffic signal light and becomes closer to the traffic signal light, the size of the traffic signal light in the traffic signal light shape information that is acquired in succession becomes bigger. In step S1022, the distance between the user and the traffic signal light may be calculated according to a relationship between a change of the distance between the user and the traffic signal light and a change of the size of the traffic signal light that is acquired.

Figure 3:
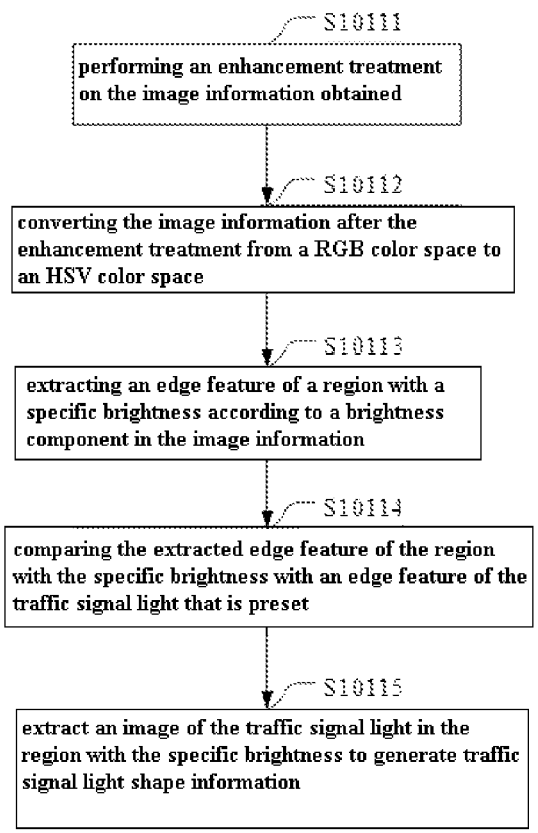
FIG. 3 is a flow chart of specific step S1011 in FIG. 2.

In an embodiment of the present disclosure as shown in FIG. 3, the step S1021 of generating the traffic signal light shape information according to the image information includes:

Step S10211: performing an enhancement treatment on the obtained image information;

Step S10212: converting the image information after the enhancement treatment from a RGB color space to an HSV color space;

Step S10213: extracting an edge feature of a region with a specific brightness according to a brightness component in the image information;

Step S10214: comparing the extracted edge feature of the region with the specific brightness with an edge feature of the traffic signal light that is preset; and Step S10215: extracting an image of the traffic signal light in the region with the specific brightness to generate the traffic signal light shape information.

In an embodiment, the step S10211 of performing an enhancement treatment on the obtained image information may be performed by means of a denoising and normal histogram equalization process to enhance local contrast of the image.

The brightness value of the region with the specific brightness in step S10213 may be set according to common brightness of a traffic signal light. The edge feature of the region with the specific brightness in the image information may be extracted by means of a Canny operator marginal detection algorithm.

The region with the specific brightness extracted in step S10213 may be affected by lighting articles including an automobile tail light or neon lamp, thus in order to accurately extract the shape of the traffic signal light, in step S10214, the edge feature of the extracted region with the specific brightness is compared with the preset edge feature of the traffic signal light, which may include height feature and profile feature of the traffic signal light;

The traffic signal light shape information extracted in step S10215 may include shape information and size information of the traffic signal light.

Figure 4:
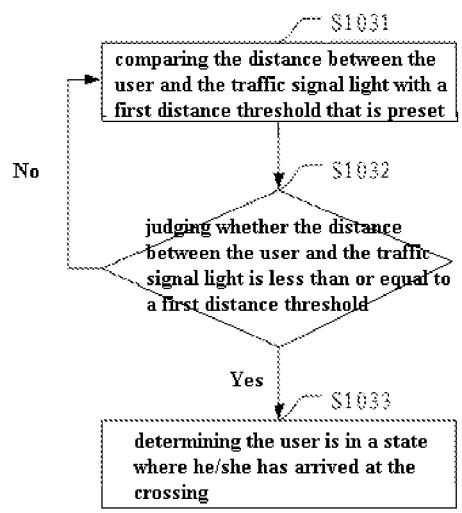
FIG. 4 is a flow chart of one implementation mode of specific step S103 in FIG. 1.

In the embodiment, the step S103 of judging the distance between the user and the crossing according to the distance between the user and the traffic signal light may be performed by the following two implementation modes:

Implementation mode 1: as shown in FIG. 4, the step S103 of judging the distance between the user and the crossing according to the distance between the user and the traffic signal light includes:

Step S1031: comparing the distance between the traffic signal light and the present first distance threshold;

Step S1032: performing step S1033 when the distance between the user and the traffic signal light is less than or equal to the first distance threshold; performing step S1031 when the distance between the user and the traffic signal light is greater than the first distance threshold; and Step S1033: determining the user is in a state where he/she has arrived at the crossing.

In the implementation mode, in order to ensure safety for the user passing the crossing, the present first distance threshold is greater than a maximum of the width of the road and may be adjusted according to traffic condition of a city where the user is located. In the embodiment, particularly, the present first distance threshold may be selected as 30 m.

Figure 5:
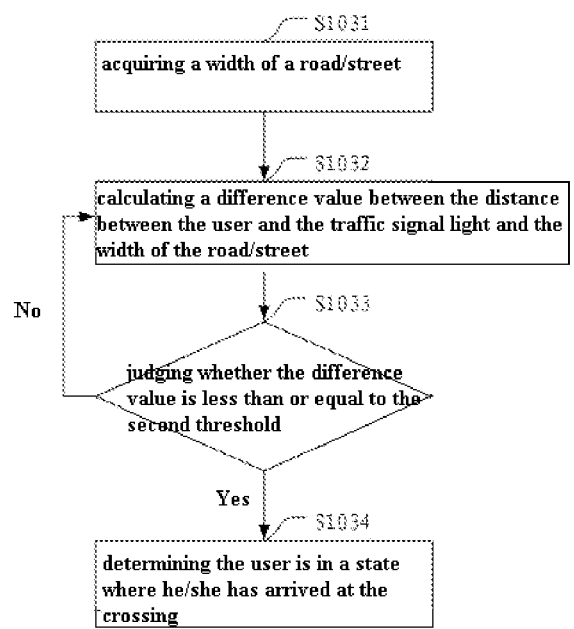
FIG. 5 is a flow chart of another implementation mode of specific step S103 in FIG. 1.

Implementation mode 2: as shown in FIG. 5, the step S103 of judging the distance between the user and the crossing according to the distance between the user and the traffic signal light includes:

Step S1031: acquiring a distance from the crossing;

Step S1032: calculating a difference value between the distance between the user and the traffic signal light and the width of the road;

Step S1033: judging whether the difference value is less than or equal to a second distance threshold or not, and performing step S1034 when the difference value is less than or equal to the second distance threshold; and performing step S1032 when the difference value is greater than the second distance threshold; and Step S1034: determining the user is in a state where he/she has arrived at the crossing.

According to the implementation mode, a distance from the user to a side of the crossing that is close to the user may be obtained by calculating the difference value between the distance between the user and the traffic signal light and the width of the road. The second distance threshold may be less than the first distance threshold. In the embodiment, particularly, the second distance threshold may be 5 m. That is, when the distance from the user to a side of the crossing that is close to the user is less than or equal to 5 m, the user is determined to be in a state where he/she has arrived at the crossing.

In another embodiment of the present disclosure, a blindman navigation method includes:

Step S101: acquiring image information of surroundings where a user is located;

Step S102: determining a distance between the user and a traffic signal light according to the image information;

Step S103: judging a distance between the user and a crossing according to the distance between the user and the traffic signal light;

Step S104: judging whether the distance between the user and a crossing is less than a distance threshold that is preset or not, and performing step S105 when the distance between the user and a crossing is less than the preset distance threshold; and performing step S101 when the distance between the user and a crossing is greater than or equal to the preset distance threshold;

Step S105: determining the user is in a state where he/she has arrived at the crossing.

Figure 6:
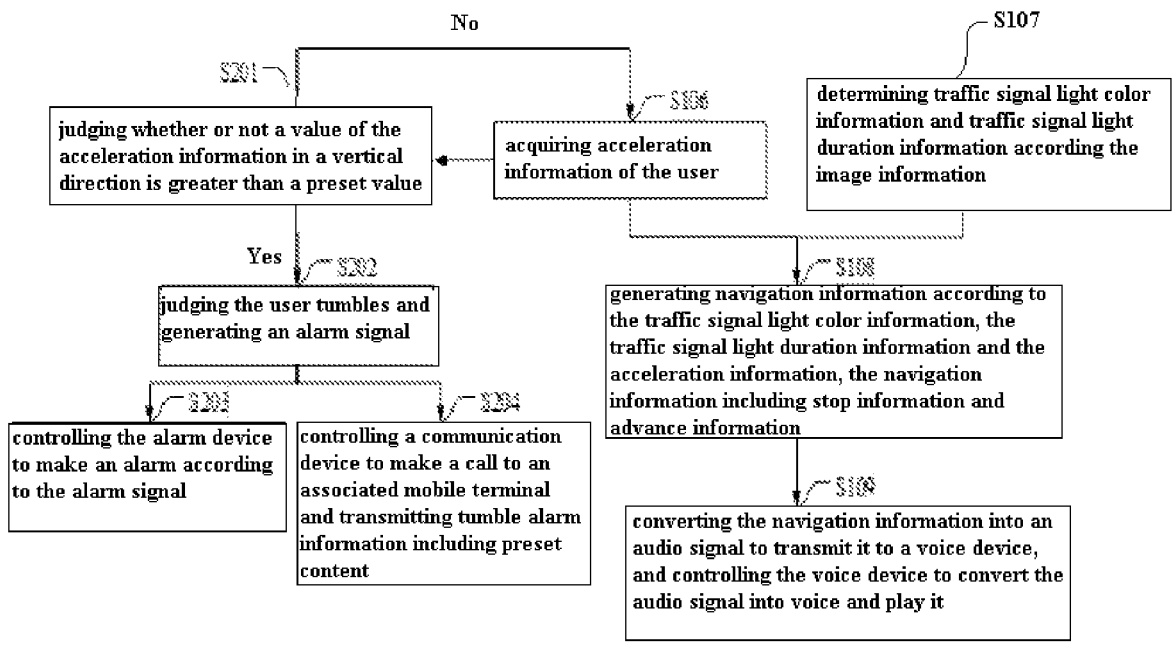
FIG. 6 is a flow chart of a process of providing navigation after judging the user is in a state where he/she/she has arrived at the crossing.

When determining the user is in a state where he/she has arrived at the crossing, as shown in FIG. 6, preferably, the blindman navigation method may further include:

Step S106: acquiring acceleration information of the user;

Step S107: determining traffic signal light color information and traffic signal light duration information according to the image information; and Step S108: generating navigation information according to the traffic signal light color information, the traffic signal light duration information and the acceleration information, the navigation information including stop information and advance information.

In the embodiment, when determining the user is in a state where he/she has arrived at the crossing, the navigation information that is used to instruct the user to advance or stop is generated, by combining the acceleration information of the user, according to the traffic signal light color information and the traffic signal light duration information at the crossing.

Figure 7:
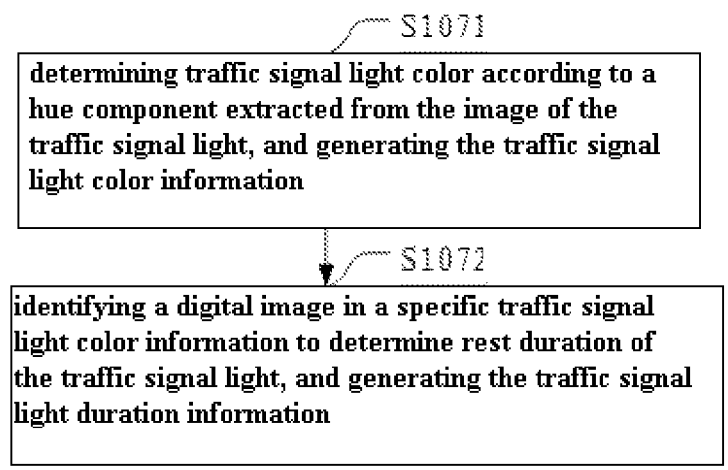
FIG. 7 is a flow chart of the specific step S107 in FIG. 6.

In an embodiment as shown in FIG. 7, the step S107 of determining the traffic signal light color information and the traffic signal light duration information according to the image information includes:

Step S1071: determining traffic signal light color according to a hue component extracted from the image of the traffic signal light, and generating the traffic signal light color information; and Step S1072: identifying a digital image in a specific traffic signal light color information to determine rest duration of the traffic signal light, and generating the traffic signal light duration information.

Figure 8:
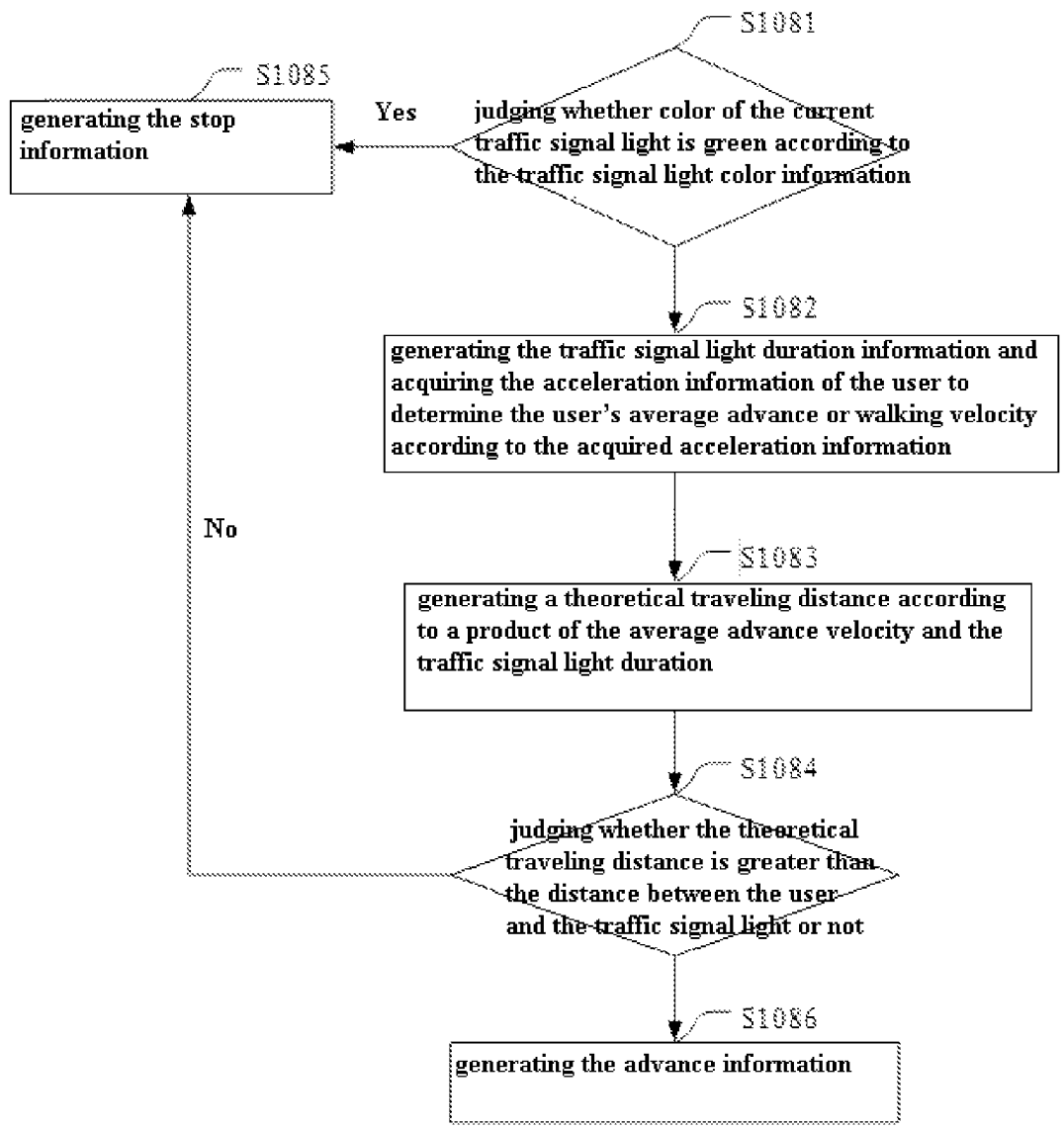
FIG. 8 is a flow chart of the specific step S108 in FIG. 6.

In an embodiment as shown in FIG. 8, the step S108 of generating the navigation information according to the traffic signal light color information, the traffic signal light duration information and the acceleration information includes:

Step S1081: judging whether color of the current traffic signal light is green according to the traffic signal light color information, and performing step S1082 when judging the color of the current traffic signal light is green; and performing step S1085 when judging the color of the current traffic signal light is not green;

Step S1082: generating the traffic signal light duration information and acquiring the acceleration information of the user to determine the user's average advance or walking velocity according to the acquired acceleration information.

Step S1083: generating a theoretical traveling distance according to a product of the average advance velocity and the traffic signal light duration;

Step S1084: judging whether the theoretical traveling distance is greater than the distance between the user and the traffic signal light or not, and performing step S1084 when the theoretical traveling distance is less than the distance between the user and the traffic signal light; performing step S1085 when the theoretical traveling distance is greater than the distance between the user and the traffic signal light;

Step S1085: generating the stop information; and

Step S1086: generating the advance information.

In the embodiment, when the user is in a state where he/she has arrived at the crossing, the stop information is generated to prevent the user from getting caught danger due to continuing advancing; when the traffic signal light is green, the theoretical traveling distance is generated according to the product of the average advancing velocity of the user and the rest duration of the traffic signal light to be used for judging whether or not the user may pass across the crossing within the rest duration of the traffic signal light that is being green, so as to generate the advance information when the user can pass across the crossing, or generate the stop information when the user cannot.

The embodiment may implement navigation aiming to the color and rest duration of the traffic signal light at the crossing, thereby increasing safety when the user passes the crossing.

In the embodiment as shown in FIG. 6, in addition to step S101 and step S108, the navigation method may further include:

Step S109: converting the navigation information into an audio signal to transmit it to a voice device, and controlling the voice device to convert the audio signal into voice and play it. The stop information in the navigation information may be a voice information that prompt the user to stop, such as a voice of "the crossing ahead cannot be passed across and please stop" or other related voice. The advance information in the navigation information may be a voice information that prompt the user to advance, such as a voice of "the crossing ahead can be passed across and please advance" or other related voice.

In an embodiment, the navigation information is played by voice, thereby increasing convenience when providing navigation for a blind user.

In a still embodiment of the present disclosure, the blindman navigation method according to the embodiment of the present disclosure includes step S101 to step S109; further, in order to detect whether the user tumbles or not and make a corresponding alarm aiming to the tumble of the user, the blindman navigation method may further include:

Step S201: judging whether or not a value of the acceleration information in a vertical direction is greater than a preset value, and performing step S202 when the value of the acceleration information in the vertical direction is greater than the preset value;

Step S202: judging the user tumbles and generating an alarm signal; and

Step S203: controlling the alarm device to make an alarm according to the alarm signal.

As the component of the acceleration of the user in the vertical direction changes when he/she tumbles, after obtaining the user's acceleration information, it is judged that the user tumbles when detecting the change of the component of the user's acceleration is greater than the preset value. In this moment, the alarm signal is generated and the alarm device is controlled to give out an alarm, causing attention from the surroundings and decreasing probability of which the user further involves danger.

Preferably, in order to cause attention from the surroundings when the user tumbles, step S203 of controlling the alarm device to make an alarm according to the alarm signal includes:

controlling the alarm device to make an acousto-optic alarm, such as an alarm of light or an alarm of voice, according to the alarm signal.

In a still embodiment of the present disclosure, preferably, in order to notice a related person to come to solve problem when the user tumbles, the blindman navigation method further includes:

Step S204: controlling a communication device to make a call to an associated mobile terminal and transmitting tumble alarm information including preset content.

Specifically, the tumble alarm information including preset content includes tumble prompt information and user's position information. The associated person may, after receiving the tumble prompt information, go to the field where the user tumbles according to the user's position information, providing rescue work to the user.

Figure 9:
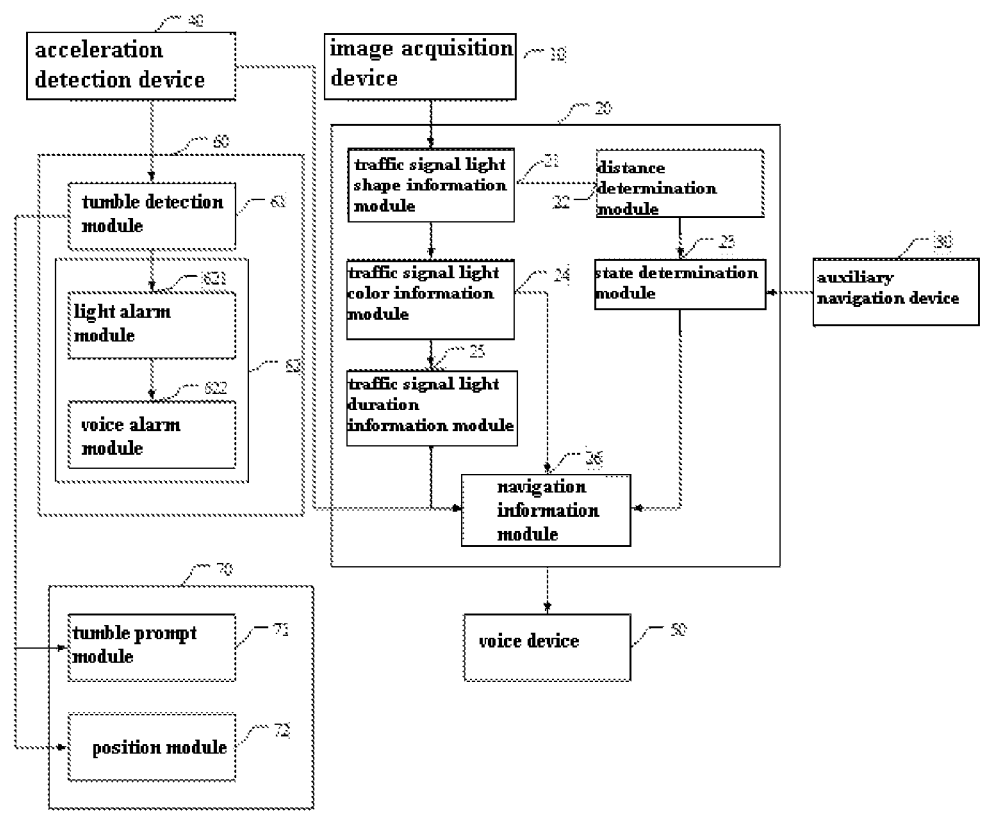
FIG. 9 is a structural schematic view of a blindman navigation apparatus according to an embodiment of the present disclosure.

The embodiment provides a blindman navigation apparatus, as shown in FIG. 9, including an image acquisition device 10 and a navigation device 20 which are put on a user's head, an output terminal of the image acquisition device 10 being in connection with an input terminal of the navigation device 20, in which:

the image acquisition device 10 is configured to acquire image information of surroundings where the user is located and transmit the image information to the navigation device 20;

the navigation device 20 is configured to determine a distance between the user and a traffic signal light according to the image information, and judge a distance between the user and a crossing according to the distance between the user and the traffic signal light, and determine the user is in a state where he/she has arrived at the crossing when the distance between the user and the crossing is less than a distance threshold that is preset.

The blindman navigation apparatus includes the image acquisition device 10 and the navigation device 20 and acquires the image information in the surrounding where the user is located by the image acquisition device 10, processes the image information by the navigation device 20 to determine the distance between the user and the traffic signal light, judges the distance between the user and the crossing according to the distance between the user and the traffic signal light, and determine the user is in a state where he/she has arrived at the crossing when the distance between the user and the crossing is less than a distance threshold that is preset. The navigation apparatus may identify whether or not the user is being passing across the crossing, thereby increasing safety for the user when arriving at the crossing. When the user is of outside activity and needs to pass across a crossing provided with a traffic signal light, the navigation apparatus may identify whether the user arrivals at the crossing or not, and provide follow-up navigation work depending on the indication of the traffic signal light at the crossing, increasing safety when the user arrivals at the crossing.

In an embodiment of the present disclosure, by referring to FIG. 9, the blindman navigation apparatus includes the image acquisition device 10 and the navigation device 20 that are put on the user's head, the image acquisition device 10 includes at least a camera, an output terminal of which is in connection with an input terminal of the navigation device 20 and which is used to shoot an image of the surroundings where the user is located and generate image information, and transmit the image information to the navigation device 20.

In an embodiment of the present disclosure, by referring to FIG. 9, the blindman navigation apparatus includes the image acquisition device 10 and the navigation device 20 that are put on the user's head, the navigation device 20 includes a traffic signal light shape information module 21 and a distance determination module 22, an input terminal of the traffic signal light shape information module 21 is in connection with an output terminal of the image acquisition module and an input terminal of the distance determination module 22 is in connection with an output terminal of the traffic signal light shape information module 21;

The traffic signal light shape information module 21 may be configured to perform an enhancement treatment on the obtained image information. Specifically, for example, a denoising and normal histogram equalization process may be used to enhance local contrast of the image; and the traffic signal light shape information module may be configured to convert the image information after the enhancement treatment from a RGB color space to an HSV color space and extract an edge feature of a region with a specific brightness according to brightness component in the image information. Specifically, the brightness value of the region with the specific brightness may be set according to common brightness of a traffic signal light. The edge feature of the region with the specific brightness in the image information may be extracted by means of a Canny operator marginal detection algorithm. Further, considering in some situation where the extracted region with the specific brightness may be affected by lighting articles including an automobile tail light or neon lamp, in order to accurately extract the shape of the traffic signal light, the edge feature of the extracted region with the specific brightness is compared with the preset edge feature of the preset traffic signal light, which may include height feature and profile feature of the traffic signal light. Further, the edge feature of the extracted region with the specific brightness is compared with the edge feature of the preset traffic signal light to extract the image of the traffic signal light in the region with the specific brightness, and generate the traffic signal light shape information;

the distance determination module 22 is configured to determine the distance between the user and the traffic signal light according to a corresponding variation relationship between a size of the traffic signal light in the generated traffic signal light shape information and a distance between the user and the traffic signal light, and generate traffic signal light distance information. Specifically, as the user advances toward the traffic signal light and becomes closer to the traffic signal light, the size of the traffic signal light in the traffic signal light shape information that is acquired in succession becomes bigger. The distance between the user and the traffic signal light may be calculated according to a relationship between a change of the distance between the user and the traffic signal light and a change of the size of the traffic signal light that is acquired.

In an embodiment of the present disclosure, by referring to FIG. 9, the navigation device 20 of the blindman navigation apparatus may further include a state determination module 23, an input terminal of which is in connection with an output terminal of the distance determination module 22;

The state determination module 23 is configured to receive the traffic signal light distance information from the distance determination module 22 to compare the distance between the user and the traffic signal light with a first distance threshold that is preset. In order to ensure safety for the user when passing across the crossing, the preset first distance threshold should be greater than a maximum of the width of the road and may be adjusted depending on the situation of the city where the user is located. In the embodiment, specifically, the preset first distance threshold may be selected as 30 m.

When the distance between the user and the traffic signal light is less than or equal to the first distance threshold, it is determined that the user is in a state where he/she has arrived at the crossing, and the navigation instruction information is generated.

In an embodiment of the present disclosure, in order to further increase accuracy of judging whether the user is being in state where he/she is located at the crossing, referring to FIG. 9, the blindman navigation apparatus further includes an auxiliary navigation device 30 provided on the traffic signal light; the auxiliary navigation device 30 being in wirelessly connection with the state determination module 23 that is located in an effective transmission distance therefrom;

the auxiliary navigation device 30 is configured to store width information of the road where the traffic signal light is located and transmit the width information of the road to the navigation device 20 which is wirelessly connected thereto;

the state determination module 23 is configured to receive the width information of the road from the auxiliary navigation device 30 and calculate a difference value between the distance between the user and the traffic signal light and the width of the road, and determine the user is in a state where he/she has arrived at the crossing when the difference value is less than or equal to a second distance threshold, and generate navigation instruction information. A distance from the user to a side of the crossing that is close to the user may be obtained by calculating the difference value between the distance between the user and the traffic signal light and the width of the road. The second distance threshold may be less than the first distance threshold. In the embodiment, particularly, the second distance threshold may be 5 m. That is, when the distance from the user to a side of the crossing that is close to the user is less than or equal to 5 m, the user is determined to be in a state where he/she has arrived at the crossing.

In an embodiment of the present disclosure, referring to FIG. 9, in order to detect advancing acceleration of the user, the blindman navigation apparatus may further includes: an acceleration detection device 40 that is put on the user's head, an output terminal of the acceleration detection device 40 being in connection with an input terminal of the navigation device 20;

The navigation device 20 further includes a traffic signal light color information module 24 and a traffic signal light duration information module 25, an input terminal of the traffic signal light color information module 24 being in connection with an output terminal of the traffic signal light shape information module 21, an input terminal of the traffic signal light duration information module 25 being in connection with an output terminal of the traffic signal light color information module 24;

the navigation device 20 further includes a navigation information module 26, an input terminal of which is in connection with output terminals of the state determination module 23, the traffic signal light color information module 24, the traffic signal light duration information module 25, the acceleration detection device 40 and the auxiliary navigation device 30 respectively, wherein:

the acceleration detection device 40 is configured to acquire acceleration information of the user and transmit the acceleration information to the navigation information module 26;

the traffic signal light color information module 24 is configured to determine traffic signal light color according to a hue component in the extracted traffic signal light image and generate the traffic signal light color information and transmit it to the navigation information module 26;

the traffic signal light duration information module 25 is configured to identify a digital image in the extracted traffic signal light image to determine rest duration of the traffic signal light and generate the traffic signal light duration information and transmit it to the navigation information module 26;

the navigation information module 26 is configured to, after receiving the navigation instruction information from the state determination module 23, judge whether the traffic signal light color is green according to the traffic signal light color information, and generate the stop information when the traffic signal light color is not green;

the navigation information module 26 is further configured to calculate the average advance velocity of the user according to the acceleration information when the traffic signal light color is green, and generate a theoretical traveling distance according to product of the average advance velocity and the traffic signal light duration, and compare the theoretical traveling distance with the distance information; and the navigation information module 26 is further configured to generate the advance information when the theoretical traveling distance is greater than the distance information, and generate the stop information when the theoretical traveling distance is less than the distance information.

In an embodiment of the present disclosure, referring to FIG. 9, in order to provide navigation service for a blindman, the navigation information may be converted into voice output. The blindman navigation apparatus further includes a voice device 50 that is put on the user's head, an input terminal of the voice device being in connection with an output terminal of the navigation information module 26;

the navigation information module 26 is further configured to convert the navigation information into an audio signal and transmit it to the voice device 50;

the voice device 50 is configured to convert the audio signal into voice and play it.

The stop information in the navigation information may be may be a voice information that prompt the user to stop, such as a voice of "the crossing ahead cannot be passed across and please stop" or other related voice. The advance information in the navigation information may be a voice information that prompt the user to advance, such as a voice of "the crossing ahead can be passed across and please advance" or other related voice.

In an embodiment of the present disclosure, the voice device 50 includes at least an earphone, an input terminal of which is in connection with an output terminal of the navigation device and which is configured to convert the audio signal into voice and play it.

In an embodiment of the present disclosure, as shown in FIG. 9, in order to detect whether the user tumbles or not and make a corresponding alarm aiming to the tumble of the user, the blindman navigation apparatus may further include: a tumble alarm device 60, which comprises a tumble detection module 61 and an alarm module 62, an input terminal of the tumble detection module 61 being in connection with an output of the acceleration detection device 40 and an input terminal of the alarm module 62 being in connection with an output terminal of the tumble detection module 61;

the tumble detection module 61 is configured to judge whether the user tumbles or not according to the acceleration information, and judge the user tumbles when a value of the acceleration information in a vertical direction is greater than a preset value and generate the alarm signal when judging the user tumbles and transmit the alarm information to the alarm module 62;

the alarm module 62 is configured to transmit an alarm according to the alarm information.

As the component of the acceleration of the user in the vertical direction changes when he tumbles, after obtaining the user's acceleration information, the user is judged to tumble when detecting the change of the component of the user's acceleration is greater than the preset value, and the alarm device is controlled to give out an alarm, causing attention from the surroundings and decreasing probability of which the user further involves danger.

In an embodiment of the present disclosure, as shown in FIG. 9, the tumble alarm device 60 may include a voice alarm module 622 and a light alarm module 62, input terminals of the voice alarm module 622 and the light alarm module 621 being in connection with an output terminal of the acceleration processing (detection?) device respectively, and the voice alarm module 622 is configured to give out an alarm voice according to the alarm signal and the light alarm module 621 is configured to give out an alarm light according to the alarm signal. The alarm voice and the alarm light may cause attention from the surroundings when the user tumbles and decrease probability of which the user further involves danger.

In an embodiment of the present disclosure, as shown in FIG. 9, in order to inform related person to come to field where the user tumbles when he/she tumbles, the blindman navigation apparatus may further include: a communication device 70, an input terminal of which is in connection with an output terminal of the tumble detection module 60 and which is configured to make a call to the associated mobile terminal when receiving the alarm signal and transmit the tumble alarm information including preset content.

In an embodiment of the present disclosure, the communication device 70 comprises a tumble prompt module 71 and a position module 72, input terminals of the tumble prompt module 71 and the position module 72 being in connection with an output terminal of the tumble detection module 61 respectively, and the tumble detection module 61 is configured to make a call to the associated mobile terminal when receiving the alarm signal and transmit tumble prompt information, and the position module 72 is configured to make a call to the associated mobile terminal when receiving the alarm signal and transmit the position information of the user. The related person may come to the field where the user tumbles according to the position information of the user after receiving the tumble prompt information, to provide rescue work to the user.

Obviously, various changes and modifications may be made by those skilled in the art to those embodiments of the present disclosure without departing from the principle and spirit of the present disclosure. Thereby, these changes and modifications are intended to be included in the scopes of the present disclosure if these changes and modifications to the present disclosure fall within the scopes defined by the appended claims and their equivalents.

The invention claimed is:

1. A blindman navigation method, comprising:
    obtaining image information of surroundings where a user is located;
    determining a distance between the user and a traffic signal light according to the image information; and
    judging a distance between the user and a crossing according to the distance between the user and the traffic signal light, and determining the user is in a state where he/she has arrived at the crossing when the distance between the user and the crossing is less than or equal to a first distance threshold that is preset;
    wherein determining the distance between the user and the traffic signal light according to the image information comprises:
        generating traffic signal light shape information according to the image information; and
        determining the distance between the user and the traffic signal light according to a corresponding variation relationship between a size of the traffic signal light in the generated traffic signal light shape information and a distance between the user and the traffic signal light; and
    wherein generating the traffic signal light shape information according to the image information comprises:
        performing an enhancement treatment on the image information obtained;
        converting the image information after the enhancement treatment from a RGB color space to an HSV color space; and
        extracting an edge feature of a region with a specific brightness according to a brightness component in the image information, and comparing the extracted edge feature of the region with the specific brightness with an edge feature of the traffic signal light that is preset so as to extract an image of the traffic signal light in the region with the specific brightness to generate traffic signal light shape information.

2. The blindman navigation method according to claim 1, wherein judging the distance between the user and the crossing according to the distance between the user and a traffic signal light comprises:

acquiring a width of a road;

calculating a difference value between the distance between the user and the traffic signal light and the width of the road; and determining the user is in a state where he/she has arrived at the crossing when the difference value is less than or equal to a second distance threshold.

3. The blindman navigation method according to claim 1, further comprising:

determining traffic signal light color information and traffic signal light duration information according the image information when determining the user is in a state where he/she has arrived at the crossing, and obtaining acceleration information of the user; and generating navigation information according to the traffic signal light color information, the traffic signal light duration information and the acceleration information, the navigation information including stop information and advance information.

4. The blindman navigation method according to claim 3, wherein determining the traffic signal light color information and the traffic signal light duration information according the image information comprises:

determining a color of the traffic signal light according to a hue component of the traffic signal light image extracted, and generating the traffic signal light color information; and identifying a digital image of a specific traffic signal light color information to determine a rest duration of the traffic signal light and generate the traffic signal light duration information.

5. The blindman navigation method according to claim 3, wherein generating navigation information according to the traffic signal light color information, the traffic signal light duration information and the acceleration information comprises:

judging whether a color of the current traffic signal light is green or not according to the traffic signal light color information, and generating the stop information when the color of the traffic signal light is not green;

generating the traffic signal light duration information when the color of the current traffic signal light is green, and obtaining the acceleration information of the user, to determine an average advance velocity of the user according to the acceleration information obtained;

generating a theoretical traveling distance according to a product of the average advance velocity and the traffic signal light duration and comparing the theoretical traveling distance with the distance between the user and the traffic signal light;

generating the advance information when the theoretical traveling distance is greater than the distance between the user and the traffic signal light; and generating the stop information when the theoretical traveling distance is less than the distance between the user and the traffic signal light.

6. The blindman navigation method according to claim 3, further comprising:

converting the navigation information into an audio signal for transmission to a voice device, and controlling the voice device to convert the audio signal into voice and play it.

7. The blindman navigation method according to claim 3, further comprising:

judging whether the user tumbles or not according to the acceleration information obtained, and judging the user has tumbled when a value of the acceleration information in a vertical direction is greater than a preset value and generating an alarm signal when judging the user has tumbled; and controlling an alarm device to make an alarm according to the alarm signal.

8. The blindman navigation method according to claim 7, wherein controlling the alarm device to make an alarm according to the alarm signal comprises:

controlling the alarm device to send out an acousto-optic alarm.

9. The blindman navigation method according to claim 7, further comprising:

further controlling a communication device to make a call to an associated mobile terminal and transmitting tumble alarm information including preset content, when generating the alarm signal.

10. The blindman navigation method according to claim 9, wherein the tumble alarm information including preset content comprises tumble prompt information and the user's position information.

* * * * *